(12) United States Patent
Yang et al.

(10) Patent No.: US 8,000,281 B2
(45) Date of Patent: Aug. 16, 2011

(54) SYSTEM AND METHOD FOR PROVIDING MULTICAST/BROADCAST SERVICES IN A WIRELESS NETWORK

(75) Inventors: Jen-Shun Yang, Hsin-Chu (TW); Chia-Lung Liu, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 9 days.

(21) Appl. No.: 12/183,734

(22) Filed: Jul. 31, 2008

(65) Prior Publication Data
US 2009/0041045 A1    Feb. 12, 2009

Related U.S. Application Data

(60) Provisional application No. 60/935,382, filed on Aug. 9, 2007.

(51) Int. Cl.
*H04L 12/28* (2006.01)
(52) U.S. Cl. ...................... 370/312; 370/395.3
(58) Field of Classification Search ............... 370/312, 370/395.3
See application file for complete search history.

(56) References Cited

U.S. PATENT DOCUMENTS

| | | | | |
|---|---|---|---|---|
| 5,487,083 A | * | 1/1996 | Nakajima et al. | 375/142 |
| 6,122,522 A | * | 9/2000 | Lee | 455/458 |
| 6,473,624 B1 | * | 10/2002 | Corbett et al. | 455/522 |
| 6,631,266 B1 | * | 10/2003 | Lee et al. | 455/446 |
| 6,781,999 B2 | * | 8/2004 | Eyuboglu et al. | 370/399 |
| 7,099,655 B2 | * | 8/2006 | Song et al. | 455/411 |
| 7,162,250 B2 | * | 1/2007 | Misra | 455/453 |
| 2006/0039284 A1 | * | 2/2006 | Zhai et al. | 370/235 |
| 2006/0142014 A1 | * | 6/2006 | Furukawa et al. | 455/446 |
| 2006/0224922 A1 | * | 10/2006 | Radulescu et al. | 714/30 |
| 2007/0086460 A1 | | 4/2007 | Choi et al. | |
| 2008/0259835 A1 | * | 10/2008 | Venkatachalam et al. | 370/311 |

FOREIGN PATENT DOCUMENTS

EP    1802157 A1    6/2007

* cited by examiner

*Primary Examiner* — Daniel J Ryman
*Assistant Examiner* — Jay P Patel
(74) *Attorney, Agent, or Firm* — Finnegan, Henderson, Farabow, Garrett & Dunner, LLP

(57) ABSTRACT

A method for allocating a multicast connection identifier (MCID) to a new multicast/broadcast service (MBS) provided in a wireless network including a plurality of base stations. The method includes: calculating, for a new MBS zone and existing MBS zones, coverage area ratios each based on information regarding the new MBS zone and one of the existing MBS zones, the new MBS zone including a first group of base stations, the one of the existing MBS zones including a second group of base stations; and allocating an MCID to the new MBS based the coverage area ratios; wherein the first group of base stations include ones of the plurality of base stations to transmit data relating to the new MBS, and the second group of base stations include ones of the plurality of base stations to transmit data relating to at least one existing MBS.

22 Claims, 5 Drawing Sheets

SYSTEM AND METHOD FOR PROVIDING MULTICAST/BROADCAST SERVICES IN A WIRELESS NETWORK

RELATED APPLICATIONS

This application is based upon and claims the benefit of priority from U.S. Provisional Patent Application No. 60/935,382, filed Aug. 9, 2007, the entire contents of which are incorporated herein by reference.

FIELD OF THE INVENTION

This invention relates to systems and methods for providing multicast/broadcast services (MBSs) in a wireless network.

BACKGROUND OF THE INVENTION

Wireless communications operating according to a predetermined protocol have gained worldwide popularity. The advantages of the wireless medium include the capacity to address broad geographic areas without expensive infrastructure development such as running cables. The broadband wireless access industry is guided by IEEE standard 802.16 for wide area networks.

Worldwide Interoperability for Microwave Access (WiMAX) is a wireless communications technology for providing wireless data based on the IEEE standard 802.16. A WiMAX network provides an alternative to cabled access networks, such as a digital subscriber line (DSL). In addition, the WiMAX technology may provide fixed, nomadic, portable, and mobile wireless broadband connectivity to a base station.

The IEEE standard 802.16 supports a multicast/broadcast service (MBS), which can provide service data to a plurality of users who desire to receive the same service in the WiMAX network. For example, the service data may be movies, games, or TV programs, and is usually stored on one or more MBS servers. A user terminal, such as a mobile phone or a laptop, subscribing to an MBS may receive data relating to the MBS through access to one or more base stations (BSs) in the WiMAX network.

For example, a plurality of BSs located in a geographic area each may transmit the data relating to the MBS based on the same multicast connection identifier (MCID). Typically, the plurality of BSs are in the same MBS zone. An MBS zone is a set of BSs in a geographic area which use the same MCID to transmit data relating to one or more MBSs. The advantages of the MBS zone include that the user terminal may receive signals from ones of the plurality of BSs in the MBS zone simultaneously. This would provide a diversity gain and performance improvement for the received signals. Further, the user terminal may receive the data relating to the MBS from any one of the plurality of BSs in the MBS zone without requiring a handover.

Typically, an MBS is associated with a multicast Internet Protocol (IP) address. Internet Protocol version 4 (IPv4) provides $2^{28}$ multicast IP addresses. Therefore, theoretically, IPv4 may support as many as $2^{28}$ MBSs. In reality, there may be hundreds of MBSs provided by service providers. However, there are only 94 available MCIDs according to the IEEE standard 802.16. If an MCID is allocated to only one MBS, the available MCIDs may not be enough to support the hundreds of MBSs.

SUMMARY OF THE INVENTION

In accordance with the invention, there is provided a method for allocating a multicast connection identifier (MCID) to a new multicast/broadcast service (MBS) provided in a wireless network including a plurality of base stations, the method comprising: calculating, for a new MBS zone and existing MBS zones, coverage area ratios each based on information regarding the new MBS zone and one of the existing MBS zones, the new MBS zone including a first group of base stations, the one of the existing MBS zones including a second group of base stations; and allocating an MCID to the new MBS based the coverage area ratios; wherein the first group of base stations include ones of the plurality of base stations to transmit data relating to the new MBS, and the second group of base stations include ones of the plurality of base stations to transmit data relating to at least one existing MBS.

Also in accordance with the invention, there is provided an Access Service Network Gateway (ASN-GW) for use in a communication system for providing a plurality of multicast/broadcast services (MBSs) in a wireless network, the ASN-GW to transmit data relating to the plurality of MBSs, the ASN-GW being configured to: calculate, for a new MBS zone and existing MBS zones, coverage area ratios each based on information regarding the new MBS zone and one of the existing MBS zones, the new MBS zone including a first group of base stations to transmit data relating to a new MBS, the one of the existing MBS zones including a second group of base stations to transmit data relating to at least one of the plurality of MBSs; and allocate a multicast connection identifier (MCID) to the new MBS based on the coverage area ratios.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1A:
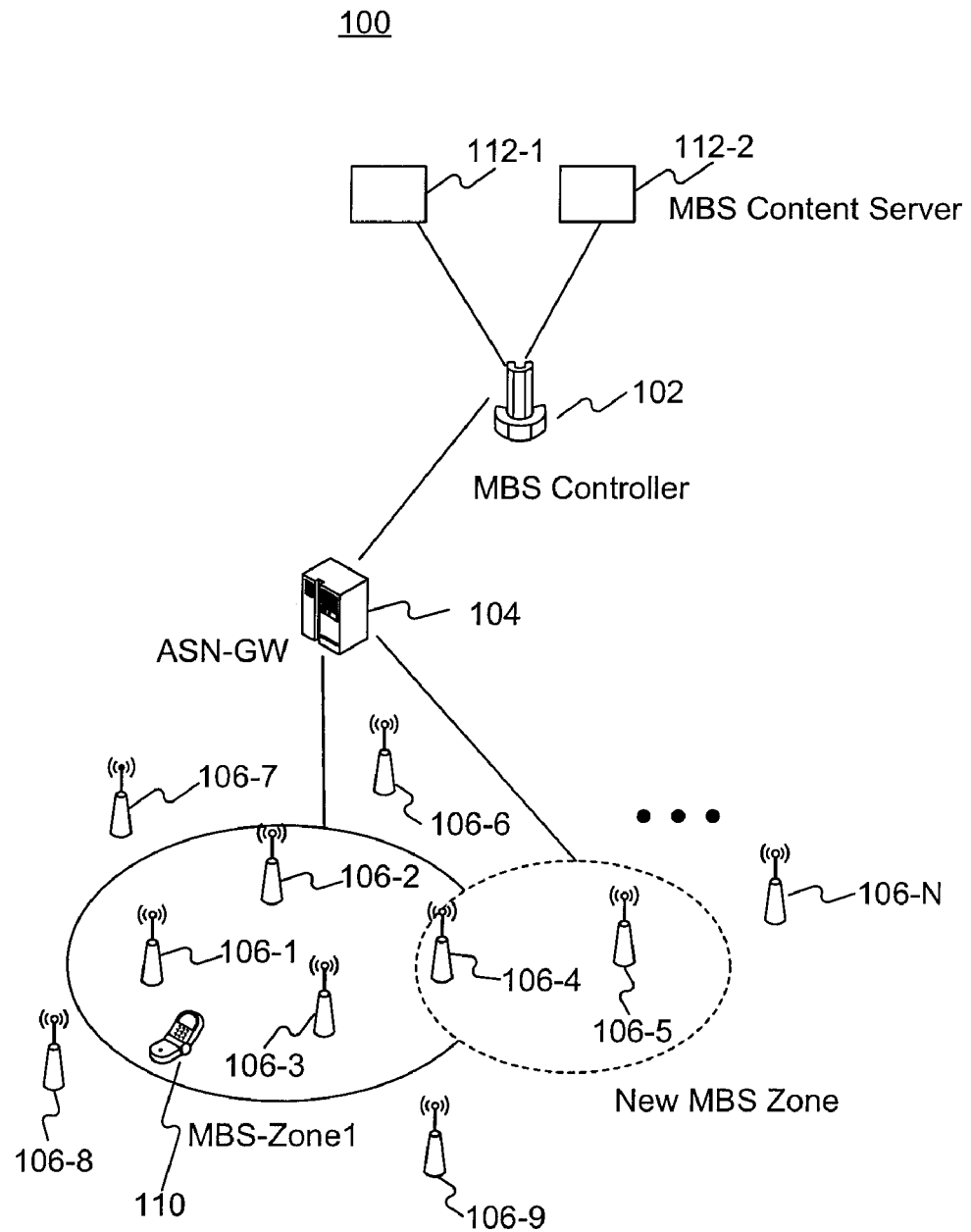
FIGS. 1A and 1B each illustrate a schematic block diagram of a communication system for providing a plurality of multicast/broadcast services (MBSs) in a wireless network, according to an exemplary embodiment.
Figure 1B:
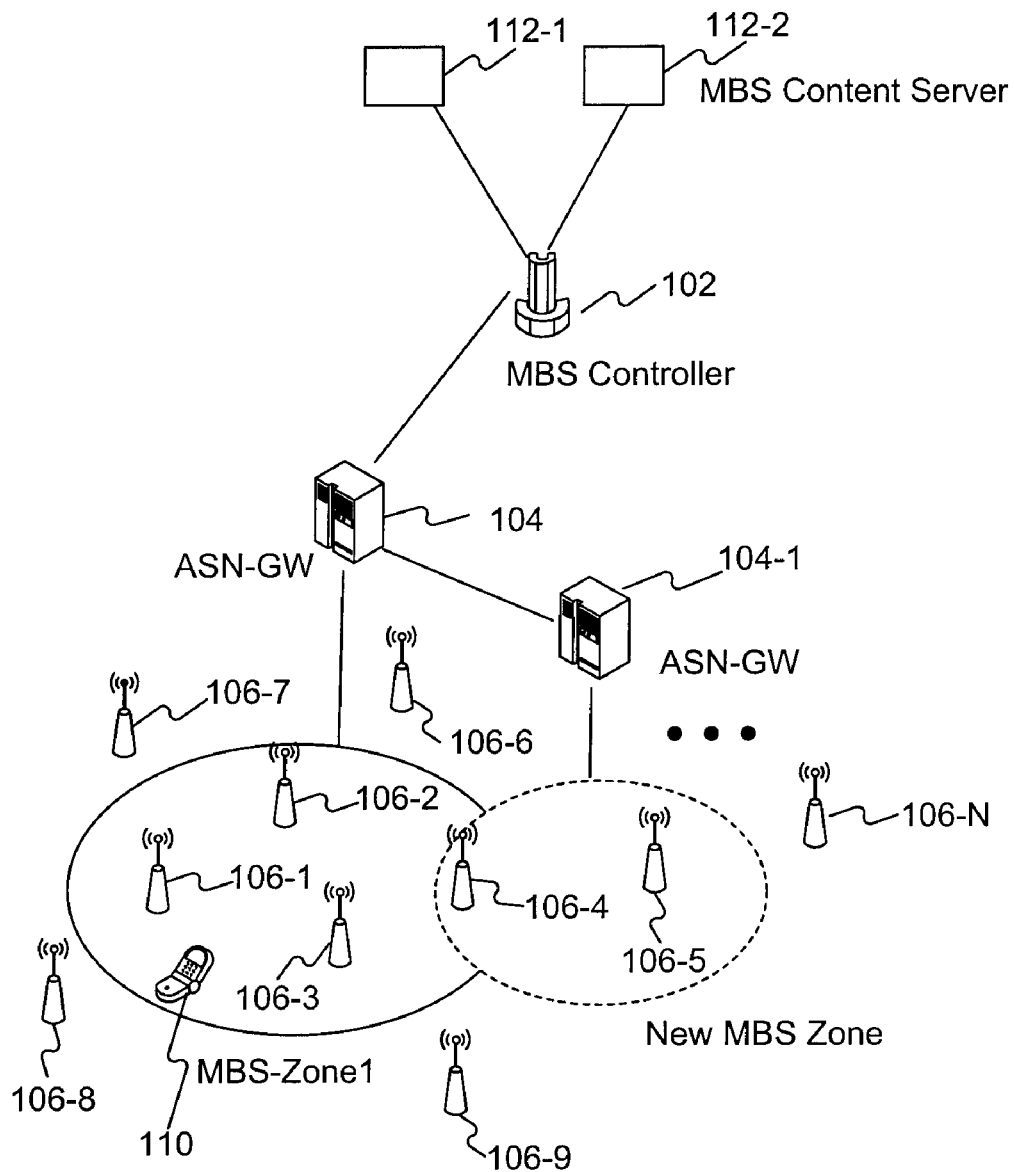

FIGS. 1A and 1B each illustrate a schematic block diagram of a communication system 100 for providing a plurality of multicast/broadcast services (MBSs) in a wireless network such as a Worldwide Interoperability for Microwave Access (WiMAX) network, according to an exemplary embodiment. Referring to FIGS. 1A and 1B, the communication system 100 may include an MBS controller 102, at least one Access Service Network Gateway (ASN-GW) 104, and a plurality of base stations (BSs) 106-1, 106-2, . . . , 106-N (N is the total number of the BSs in the communication system 100).

Each of the MBS controller 102, the ASN-GW 104, and the BSs 106-1, 106-2, . . . , 106-N may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, etc.

The communication system 100 may further include a user terminal such as a mobile station (MS) 110 and a plurality of MBS content servers. For convenience of illustration, first and second MBS content servers 112-1 and 112-2 are shown in FIGS. 1A and 1B. The first and second MBS content servers 112-1 and 112-2 are configured to store data or content of the plurality of MBSs, such as movies, games, and TV programs. The MS 110 may subscribe to one or more of the plurality of MBSs and receive the subscribed MBS(s) from the MBS content severs 112-1 and/or 112-2 through access to one or more of the plurality of BSs 106-1, 106-2, . . . , 106-N. When a new MBS provided by the MBS content server 112-1 or 112-2 is added to the plurality of MBSs, the ASN-GW 104 is configured to allocate a multicast connection identifier (MCID) to the new MBS based on methods consistent present embodiments, as described below.

In exemplary embodiments consistent with the present invention, the MBS controller 102 is configured to receive data/content relating to the plurality of MBSs, such as movies, games, and TV programs, from the MBS content servers 112-1 and/or 112-2, and to allocate a multicast Internet Protocol (IP) address to each of the plurality of MBSs. Typically, the MBS controller 102 is in a Connectivity Service Network (CSN), which provides key control and management functions for, e.g., authentication of the MS 110. The MBS content servers 112-1 and 112-2 may be in the CSN or the Internet.

The MBS controller 102 may also determine a plurality of MBS zones, each including ones of the BSs 106-1, 106-2, . . . , 106-N for broadcasting data/content of at least one of the plurality of MBSs. For illustration purposes only, FIGS. 1A and 1B each only shows an existing MBS zone MBS-Zone1 including the BSs 106-1, 106-2, and 106-3, and 106-4. A new MBS zone including the BSs 106-4 and 106-5 for broadcasting data/content of a new MBS, which will be described below, is also shown in FIGS. 1A and 1B. Further, MBSs serving in the same MBS zone, such as the MBS zone MBS-Zone1, have the same MCID.

In exemplary embodiments consistent with the present invention, the ASN-GW 104 may include an MBS proxy. The MBS proxy allocates, manages, and maintains resources in each of the MBS zones determined by the MBS controller 102. The ASN-GW 104 is configured to receive control signals and data relating to the plurality of MBSs from the MBS controller 102, and to send the data to the BSs 106-1, 106-2, . . . , 106-N. For example, the ASN-GW 104 may receive data relating to the plurality of MBSs from the MBS controller 102 via a multicast router (MR) (not shown). Also for example, the ASN-GW 104 directly communicates with the BSs 106-1, 106-2, 106-3, and 106-4 in the MBS zone MBS-Zone1 for broadcasting data/content of one or ones of the plurality of MBSs.

In exemplary embodiments consistent with the present invention, a new MBS provided by the MBS content server 112-1 or 112-2 may be added to existing MBSs in the WiMAX network. For example, when the new MBS is added to the existing MBSs in the WiMAX network, the MBS controller 102 may determine a new MBS zone including ones of the BSs 106-1, 106-2, . . . , 106-N, e.g., the BSs 106-4 and 106-5, for broadcasting data/content of the new MBS. In one exemplary embodiment, shown in FIG. 1A, the ASN-GW 104 directly communicates with the BSs 106-4 and 106-5 in the new MBS zone for broadcasting data/content of the new MBS. In one exemplary embodiment, shown in FIG. 1B, the ASN-GW 104 communicates with the BSs 106-4 and 106-5 in the new MBS zone via a serving ASN-GW 104-1 for broadcasting data/content of the new MBS.

The ASN-GW 104 is further configured to allocate a multicast connection identifier (MCID) to the new MBS. In the illustrated embodiment, the MBS proxy in the ASN-GW 104 allocates the MCID, at least one logical channel identifier (LCID), and an MBS zone ID to the new MBS. For example, the new MBS may include a plurality of channels of TV programs. The ASN-GW 104 is configured to allocate the MCID to the new MBS and to allocate an LCID to each of the plurality of channels. Also for example, the MBS proxy may send to an MBS data path function (DPF) of the ASN-GW 104 (FIG. 1A), or the ASN-GW 104-1 (FIG. 1B), information regarding the MCID, the at least one LCID, and the MBS zone ID allocated to the new MBS. The MBS DPF may be used to send the information to the ones of the BSs 106-1, 106-2, . . . , 106-N in the new MBS zone.

In exemplary embodiments consistent with the present invention, the ASN-GW 104 (FIG. 1A) or the serving ASN-GW 104-1 (FIG. 1B) may further send an MBS communication request message MBS-REQ, including the MCID, the at least one LCID, and the MBS zone ID allocated to the new MBS, to each of the ones of the BSs 106-1, 106-2, . . . , 106-N in the new MBS zone, where the MBS communication request message MBS-REQ has a format consistent with present embodiments, as described below. Each of the ones of the BSs 106-1, 106-2, . . . , 106-N is also configured to send an MBS communication reply message MBS-RLY in response to the MBS communication request message, where the MBS communication reply message MBS-RLY has a format consistent with present embodiments, as described below. The ones of the BSs 106-1, 106-2, . . . , 106-N in the new MBS zone may then receive data relating to the new MBS, and transmit the data to the MS 110 if the MS 110 subscribes to the new MBS.

Figure 2:
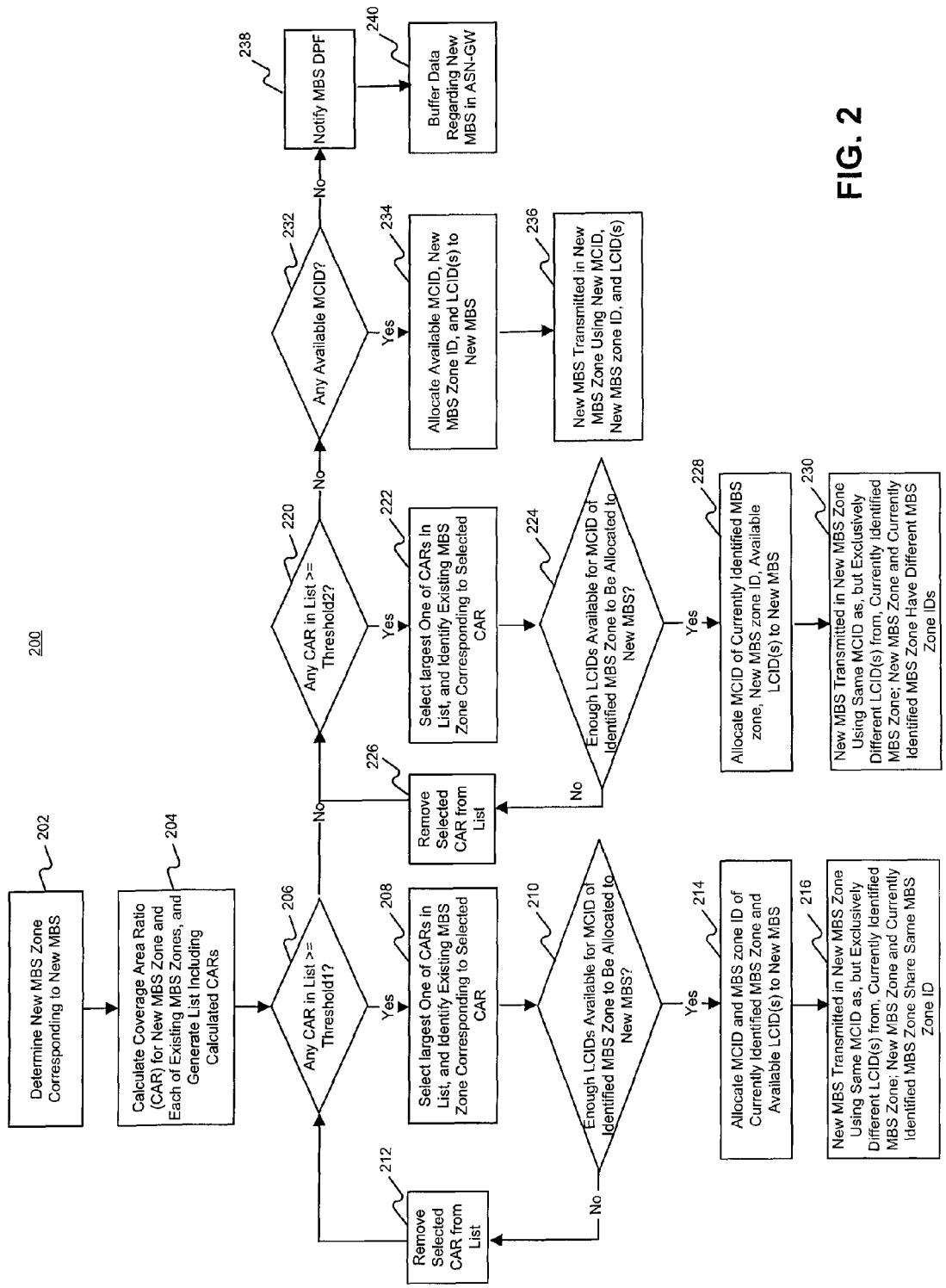
FIG. 2 illustrates a flow chart of a multicast connection identifier (MCID) sharing method for an Access Service Network Gateway (ASN-GW) to allocate an MCID to a new MBS, according to an exemplary embodiment.

FIG. 2 illustrates a flow chart 200 of an MCID sharing method for the ASN-GW 104 (FIGS. 1A and 1B) to allocate an MCID to a new MBS, according to an exemplary embodiment. For example, when the new MBS is added to existing MBSs in the WiMAX network (FIGS. 1A and 1B), the MBS proxy in the ASN-GW 104 may use the MCID sharing method to determine the MCID for the new MBS and allocate the determined MCID to the new MBS.

Referring to FIGS. 1A, 1B, and 2, a new MBS zone corresponding to the new MBS is determined (step 202). For example, the new MBS zone may include a first group or set of base stations, i.e., ones of the BSs 106-1, 106-2, . . . , 106-N to transmit data relating to the new MBS. The MBS proxy then calculates, for the new MBS zone and the existing MBS zones, coverage area ratios each based on information regarding the new MBS zone and one of the existing MBS zones. In other words, each of the existing MBS zones corresponds to a calculated coverage area ratio. The MBS proxy further generates a list including the calculated coverage area ratios (step 204).

In one exemplary embodiment, the MBS proxy may determine a coverage area ratio for the new MBS zone and the one of the existing MBS zones based on first and second areas respectively covered by first and second signals. The first signals are transmitted by the first group of base stations in the new MBS zone. The second signals are transmitted by a second group of stations, i.e., ones of the BSs 106-1, 106-2, . . . , 106-N in the one of the existing MBS zones. For example, as shown in FIGS. 1A and 1B, the first group of base stations may include the BSs 106-4 and 106-5, and the second group of base stations may include the BSs 106-1, 106-2, 106-3, and 106-4.

The MBS proxy may determine first and second values. The first value is a magnitude of an area covered by both the first and second signals. The second value is a larger one of a magnitude of the first area and a magnitude of the second area. The MBS proxy may determine the coverage area ratio for the new MBS zone and the one of the existing MBS zones by calculating a ratio between the first and second values.

In one exemplary embodiment, the MBS proxy may determine the coverage area ratio for the new MBS zone and the one of the existing MBS zones based on a number of the first group of base stations in the new MBS zone and a number of the second group of base stations in the one of the existing MBS zones.

For example, the MBS proxy may determine third and fourth values. The third value is a number of a third group of BSs including ones of the BSs 106-1, 106-2, . . . , 106-N in both the first group and the second group. The fourth value is a larger one of the number of the first group of base stations in the new MBS zone and the number of the second group of base stations in the one of the existing MBS zones. The MBS proxy may determine the coverage area ratio for the new MBS zone and the one of the existing MBS zones by calculating a ratio between the third and fourth values.

Next, the MBS proxy determines whether at least one of the coverage area ratios in a current version of the list is larger than, or equal to, a first pre-determined threshold value Threshold1 (step 206). If the MBS proxy determines that at least one of the coverage area ratios in the current version of the list is larger than, or equal to, the first pre-determined threshold value Threshold1, the MBS proxy selects a largest one of the coverage area ratios in the current version of the list.

As noted above, each of the existing MBS zones corresponds to one of the calculated coverage area ratios. Therefore, the existing MBS zone corresponding to the selected coverage area ratio may be identified (step 208). The identified MBS zone has an MBS zone ID and an MCID. The MBS proxy further determines whether there are enough LCIDs available for the MCID of the identified MBS zone to be allocated to the new MBS (step 210).

In one exemplary embodiment, the MCID of each of the existing MBS zones is paired with an 8-bit LCID. In other words, there would be a total of 256 ($2^8$) possible LCIDs for the MCID of the identified MBS zone. Ones of the 256 LCIDs may have already been allocated to ones of the existing MBSs that have the same MCID as the identified MBS zone. In addition, only available LCIDs, i.e., the LCIDs that are not being used for the MCID of the identified MBS zone, may be allocated to the new MBS, if the MCID of the identified MBS zone is allocated to the new MBS. As a result, there might not be enough LCIDs available. For example, assuming the new MBS includes M1 channels of TV programs and there are only M2 (M2<M1) LCIDs available, the MBS proxy may determine there are not enough LCIDs available for the MCID of the identified MBS zone to be allocated to the new MBS.

If the MBS proxy determines there are not enough LCIDs available for the MCID of the identified MBS zone to be allocated to the new MBS, the MBS proxy updates the current version of the list by removing the selected coverage area ratio from the current version of the list (step 212). Steps 206-212 are repeated if at least one of the calculated coverage area ratios in the current version of the list is larger than, or equal to, the first pre-determined threshold value Threshold1.

If, in step 210, the MBS proxy determines there are enough LCIDs available for an MCID of a currently identified MBS zone to be allocated to the new MBS, the MBS proxy allocates to the new MBS the MCID of the currently identified MBS zone, an MBS zone ID of the currently identified MBS zone, and at least one of the available LCIDs (step 214). In addition, the MBS proxy may send to the MBS DPF of the ASN-GW 104 (FIG. 1A), or the ASN-GW 104-1 (FIG. 1B), information regarding the MCID, the MBS zone ID, and the at least one of the available LCIDs allocated to the new MBS. As a result, data relating to the new MBS would be transmitted in the new MBS zone using the same MCID as, but exclusively different LCIDs from, the currently identified MBS zone (step 216). Further, the new MBS zone and the currently identified MBS zone share the same MBS zone ID. In other words, the first group of base stations in the new MBS zone and ones of the BSs 106-1, 106-2, . . . , 106-N in the currently identified MBS zone form a larger MBS zone.

Steps 206-212 are repeated until, in step 206, the MBS proxy determines each of the calculated coverage area ratios in the current version of the list is smaller than the first pre-determined threshold value Threshold1. The MBS proxy then determines whether at least one of the coverage area ratios in the current version of the list is larger than, or equal to, a second pre-determined threshold value Threshold2 (step 220), where the second pre-determined threshold value Threshold2 is smaller than the first pre-determined threshold value Threshold1. If the MBS proxy determines that at least one of the coverage area ratios in the current version of the list is larger than, or equal to, the second pre-determined threshold value Threshold2, the MBS proxy selects a largest one of the coverage area ratios in the current version of the list (step 222).

Accordingly, the existing MBS zone corresponding to the selected coverage area ratio may be identified. The identified MBS zone has an MBS zone ID and an MCID. The MBS proxy further determines whether there are enough LCIDs available for the MCID of the identified MBS zone to be allocated to the new MBS (step 224), similar to the description above in connection with step 210.

If the MBS proxy determines there are not enough LCIDs available for the MCID of the identified MBS zone to be allocated to the new MBS, the MBS proxy updates the current version of the list by removing the selected coverage area ratio from the current version of the list (step 226). Steps 220-226 are repeated if at least one of the calculated coverage area ratios in the current version of the list is larger than, or equal to, the second pre-determined threshold value Threshold2.

If, in step 224, the MBS proxy determines there are enough LCIDs available for an MCID of a currently identified MBS zone to be allocated to the new MBS, the MBS proxy allocates the MCID of the currently identified MBS zone, a new MBS zone ID, and at least one of the available LCIDs to the new MBS (step 228). In addition, the MBS proxy may send to the MBS DPF of the ASN-GW 104 (FIG. 1A), or the ASN-GW 104-1 (FIG. 1B), information regarding the MCID, the MBS zone ID, and the one of the available LCIDs allocated to the new MBS. As a result, data relating to the new MBS would be transmitted in the new MBS zone using the same MCID as, but exclusively different LCIDs from, the currently identified MBS zone. Further, the new MBS zone and the currently identified MBS zone have different MBS zone IDs (step 230).

Steps 220-226 are repeated until, in step 220, the MBS proxy determines each of the calculated coverage area ratios in the current version of the list is smaller than the second pre-determined threshold value Threshold2. The MBS proxy then checks whether there is any available or new MCID, i.e., the MCID that has not been allocated (step 232). If the MBS proxy determines there is at least one available MCID, the MBS proxy allocates the available or new MCID, a new MBS zone ID, and at least one LCID to the new MBS (step 234). In addition, the MBS proxy may send to the MBS DPF of the ASN-GW 104 (FIG. 1A), or the ASN-GW 104-1 (FIG. 1B), information regarding the new MCID, the new MBS zone ID, and the at least one LCID allocated to the new MBS. As a result, data relating to the new MBS would be transmitted in the new MBS zone using the new MCID, the new MBS zone ID, and the at least one LCID (step 236).

If the MBS proxy determines there is no MCID available, the MBS proxy notifies the MBS DPF of the ASN-GW 104 (FIG. 1A), or the ASN-GW 104-1 (FIG. 1B), that there is no MCID available (step 238). Data relating to the new MBS may then be buffered in the ASN-GW 104 (FIG. 1A) or the ASN-GW 104-1 (FIG. 1B) (step 240).

As noted above, after the MBS proxy allocates the MCID, the at least one LCID, and the MBS zone ID to the new MBS, the ASN-GW 104 (FIG. 1A) or the ASN-GW 104-1 (FIG. 1B) may further send an MBS communication request message MBS-REQ, including the MCID, the at least one LCID, and the MBS zone ID allocated to the new MBS, to each of the ones of the BSs 106-1, 106-2, . . . , 106-N to transmit data relating to the new MBS. Each of the ones of the BSs 106-1, 106-2, . . . , 106-N is also configured to send an MBS communication reply message MBS-RLY in response to the MBS communication request message. The ones of the BSs 106-1, 106-2, . . . , 106-N may then receive data relating to the new MBS, and transmit the data to the MS 110 if the MS 110 subscribes to the new MBS.

Figure 3:
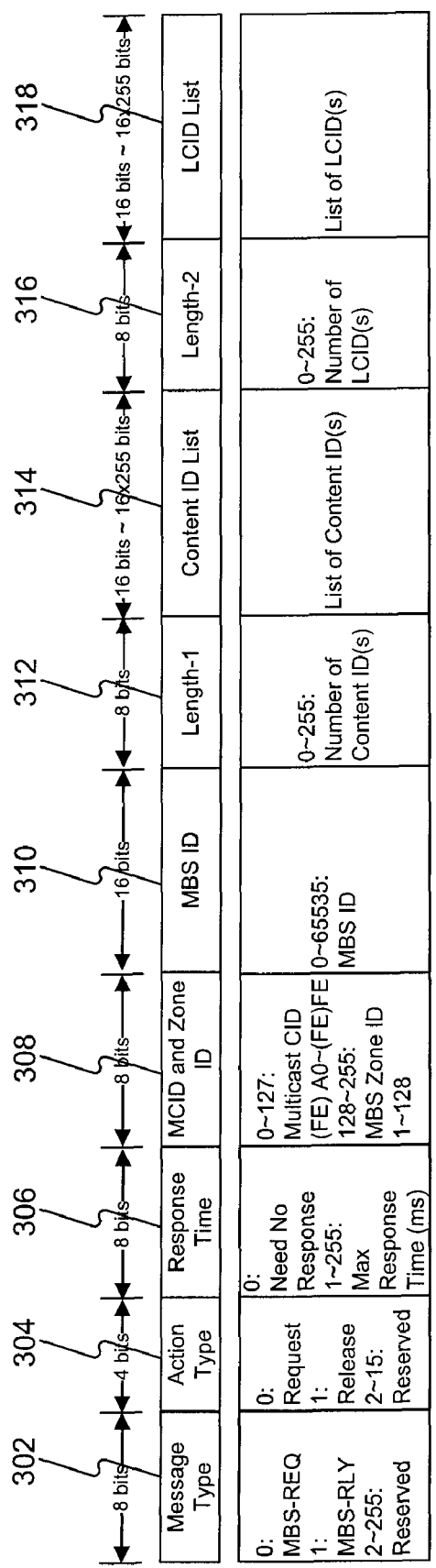
FIG. 3 illustrates a format of an MBS communication request message, according to an exemplary embodiment.

FIG. 3 illustrates a format 300 of the MBS communication request message MBS-REQ, according to an exemplary embodiment. Referring to FIG. 3, the MBS communication message MBS-REQ may include a first field Message Type 302, a second field Action Type 304, a third field Response Time 306, a fourth field MCID and Zone ID 308, a fifth field MBS ID 310, a sixth field Length-1 312, a seventh field Content ID List 314, an eighth field Length-2 316, and a ninth field LCID List 318.

In exemplary embodiments consistent with the present invention, the first field Message Type 302 has eight bits and, accordingly, has 256 ($2^8$) values including 0-255. The first field Message Type 302 indicates a type of an MBS communication message. For example, the first field Message Type 302 having the value 0 indicates the MBS communication message is an MBS communication request message MBS-REQ. Also for example, the first field Message Type 302 having the value 1 indicates the MBS communication message is an MBS communication reply message MBS-RLY, which will be described below. The values 2-255 are reserved for future use.

In exemplary embodiments consistent with the present invention, the second field Action Type 304 has four bits and, accordingly, has 16 ($2^4$) values including 0-15. The second field Action Type 304 indicates a request from the ASN-GW 104 (FIG. 1A) or the ASN-GW 104-1 (FIG. 1B). For example, if the second field Action Type 304 has the value 0, the ASN-GW 104 (FIG. 1A) or the ASN-GW 104-1 (FIG. 1B) requests one of the BSs 106-1, 106-2, . . . , 106-N in the new MBS zone to transmit data relating to the new MBS using the MCID allocated to the new MBS. The allocated MCID is specified in the fourth field MCID and Zone ID 308. Also for example, if the second field Action Type 304 has the value 1, the ASN-GW 104 (FIG. 1A) or the ASN-GW 104-1 (FIG. 1B) requests the one of the BSs 106-1, 106-2, . . . , 106-N in the new MBS zone to release an MCID designated in the MBS communication request message MBS-REQ, i.e., the MCID specified in the fourth field MCID And Zone ID 308. The values 2-15 are reserved for future use.

In exemplary embodiments consistent with the present invention, the third field Response Time 306 has eight bits and, accordingly, has 256 ($2^8$) values including 0-255. The third field Response Time 306 indicates a maximum time duration for the ASN-GW 104 (FIG. 1A) or the ASN-GW 104-1 (FIG. 1B) to receive the MBS communication reply message MBS-RLY from the one of the BSs 106-1, 106-2, . . . , 106-N in the new MBS zone. For example, if the third field Response Time 306 has the value 0, the one of the BSs 106-1, 106-2, . . . , 106-N does not need to send the MBS communication reply message MBS-RLY to the ASN-GW 104 (FIG. 1A) or the ASN-GW 104-1 (FIG. 1B). Also for example, if the third field Response Time 306 has one of the values including 1-255 such as 5, the one of the BSs 106-1, 106-2, . . . , 106-N needs to send the MBS communication reply message MBS-RLY to the ASN-GW 104 (FIG. 1A) or the ASN-GW 104-1 (FIG. 1B) within a time duration associated with the one of the values, such as 5 millisecond. If the ASN-GW 104 (FIG. 1A) or the ASN-GW 104-1 (FIG. 1B) does not receive the MBS communication reply message MBS-RLY from the one of the BSs 106-1, 106-2, . . . , 106-N within the time duration, the ASN-GW 104 may resend the MBS communication request message MBS-REQ to the one of the BSs 106-1, 106-2, . . . , 106-N.

In exemplary embodiments consistent with the present invention, the fourth field MCID and Zone ID 308 has eight bits and, accordingly, has 256 ($2^8$) values. The fourth field MCID and Zone ID 308 indicates a value of the MCID allocated to the new MBS and a value of the MBS zone ID allocated to the new MBS. For example, the value of the MCID is in a range between (FE)A0 and (FE)FE. Also for example, the value of the MBS zone ID is in a range between 1 and 128.

In exemplary embodiments consistent with the present invention, the fifth field MBS ID 310 has sixteen bits and, accordingly, has 65536 ($2^{16}$) values including 0-65535. One of the 65536 values is allocated to the new MBS for the MBS ID.

In exemplary embodiments consistent with the present invention, the sixth field Length-1 312 has eight bits and, accordingly, has 256 ($2^8$) values including 0-255. The sixth field Length-1 312 indicates a number of content ID(s), which are listed in the seventh field Content ID List 314, for the new MBS service. The seventh field Content ID List 314 lists the content ID(s) for the new MBS service. In the illustrated embodiment, the seventh field Content ID List 314 has 16×i bits, where i is the number of content ID(s) indicated by the sixth field Length-1 312.

In exemplary embodiments consistent with the present invention, the eighth field Length-2 316 has eight bits and, accordingly, has 256 ($2^8$) values including 0-255. The eighth field Length-2 316 indicates a number of LCID(s), which are listed in the ninth field LCID List 318, for the new MBS service. The ninth field LCID List 318 lists the LCID(s) for the new MBS service. In the illustrated embodiment, the ninth field LCID List 318 has 16×j bits, where j is the number of LCID(s) indicated by the eighth field Length-2 316.

Figure 4:
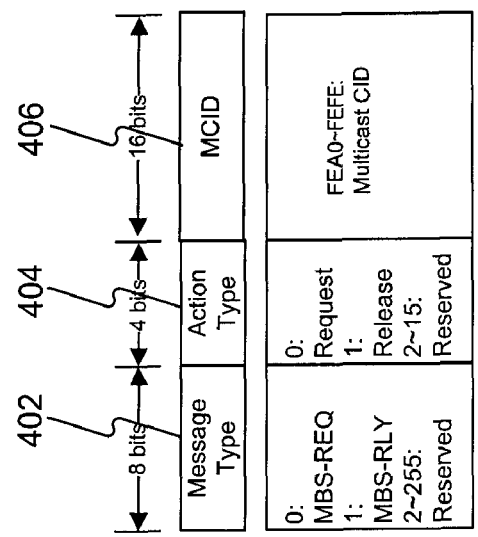
FIG. 4 illustrates a format of an MBS communication reply message, according to an exemplary embodiment.

FIG. 4 illustrates a format 400 of the MBS communication reply message MBS-RLY, according to an exemplary embodiment. Referring to FIG. 4, the MBS communication reply message MBS-RLY may include a first field Message Type 402, a second field Action Type 404, and a third field MCID 406.

In exemplary embodiments consistent with the present invention, the first field Message Type 402 has eight bits and, accordingly, has 256 ($2^8$) values including 0-255. The first field Message Type 402 indicates a type of an MBS communication message. For example, as noted above, the first field Message Type 402 having the value 0 indicates the MBS communication message is the MBS communication request message MBS-REQ. Also for example, the first field Message Type 402 having the value 1 indicates the MBS communication message is the MBS communication reply message MBS-RLY. The values 2-255 are reserved for future use.

In exemplary embodiments consistent with the present invention, the second field Action Type 404 has substantially the same content and format as the second field Action Type 304 in the MBS communication request message MBS-REQ. The third field MCID 406 has sixteen bits, indicating the MCID allocated to the new MBS.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for an Access Service Network Gateway (ASN-GW) to allocate a multicast connection identifier (MCID) to a new multicast/broadcast service (MBS) provided in a wireless network, the wireless network including a plurality of base stations, the method comprising:
   calculating, by the ASN-GW, for a new MBS zone and existing MBS zones, coverage area ratios each based on information regarding the new MBS zone and one of the existing MBS zones, the new MBS zone including a first group of base stations to transmit data relating to the new MBS, the one of the existing MBS zones including a second group of base stations to transmit data relating to at least one existing MBS; and
   allocating, by the ASN-GW, an MCID to the new MBS based on the coverage area ratios;
   wherein the calculating comprises:
      determining a magnitude of a first area covered by signals transmitted by the first group of base stations;
      determining a magnitude of a second area covered by signals transmitted by the second group of base stations;
      determining a magnitude of a third area covered by both the signals transmitted by the first group of base stations and the signals transmitted by the second group of base stations; and
      calculating the coverage area ratio for the new MBS zone and the one of the existing MBS zones, the coverage area ratio being equal to a ratio between the magnitude of the third area and a larger one of the magnitude of the first area and the magnitude of the second area.

2. The method of claim 1, further comprising transmitting data relating to the new MBS to the first group of base stations.

3. The method of claim 1, further comprising transmitting data relating to the new MBS to a user terminal through at least one of the first group of base stations.

4. The method of claim 3, wherein the user terminal is a mobile station.

5. The method of claim 1, further including generating a list of the coverage area ratios, wherein the allocating comprises:
   determining whether at least one of the coverage area ratios in a current version of the list is larger than, or equal to, a predetermined threshold value;
   selecting a largest one of the coverage area ratios in the current version of the list if at least one of the coverage area ratios in the current version of the list is larger than, or equal to, the predetermined threshold value;
   identifying one of the existing MBS zones corresponding to the selected coverage area ratio;
   judging whether there are enough logical channel identifiers (LCIDs) to be allocated to the new MBS, according to an MCID of the identified MBS zone; and
   allocating the MCID of the identified MBS zone to the new MBS if there are enough LCIDs.

6. The method of claim 5, wherein the allocating of the MCID further comprises allocating an MBS zone ID of the identified MBS zone and at least one LCID to the new MBS, the allocated LCID not being used for the MCID of the identified MBS zone.

7. The method of claim 5, further comprising:
   removing the selected coverage area ratio from the current version of the list to update the current version of the list, if there are not enough LCIDs to be allocated to the new MBS; and
   repeating the determining, the selecting, the identifying, and the judging.

8. The method of claim 5, wherein the predetermined threshold value is a first predetermined threshold value, the method comprising:
   further determining whether at least one of the coverage area ratios in the current version of the list is larger than, or equal to, a second predetermined threshold value, the second predetermined threshold value being smaller than the first predetermined threshold value;
   further selecting a largest one of the coverage area ratios in the current version of the list if at least one of the coverage area ratios is larger than, or equal to, the second predetermined threshold value;
   further identifying one of the existing MBS zones corresponding to the further selected coverage area ratio;

further judging whether there are enough LCIDs to be allocated to the new MBS, according to an MCID of the further identified MBS zone; and allocating the MCID of the further identified MBS zone to the new MBS if there are enough LCIDs.

9. The method of claim 8, wherein allocating the MCID of the further identified MBS zone to the new MBS comprises allocating a new MBS zone ID and at least one LCID to the new MBS, the allocated LCID not being used for the MCID of the further identified MBS zone.

10. The method of claim 8, further comprising:
removing the further selected coverage area ratio from the current version of the list to update the current version of the list, if there are not enough LCIDs to be allocated to the new MBS; and
repeating the further determining, the further selecting, the further identifying, and the further judging.

11. The method of claim 8, further comprising:
judging whether an additional MCID has not been allocated; and
allocating to the new MBS the additional MCID that has not been allocated.

12. The method of claim 11, wherein the allocating further comprises allocating a new MBS zone ID and at least one LCID to the new MBS.

13. The method of claim 1, further comprising sending an MBS communication request message to each of the first group of base stations.

14. The method of claim 13, wherein the sending comprises sending the allocated MCID.

15. The method of claim 13, wherein the sending comprises sending at least one logical channel identifier (LCID) allocated to the new MBS.

16. The method of claim 13, wherein the sending comprises sending an MBS zone ID allocated to the new MBS zone.

17. The method of claim 13, further comprising receiving an MBS communication reply message from one of the first group of base stations responding to the MBS communication request message, wherein the MBS communication reply message includes the allocated MCID.

18. A method for an Access Service Network Gateway (ASN-GW) to allocate a multicast connection identifier (MCID) to a new multicast/broadcast service (MBS) provided in a wireless network, the wireless network including a plurality of base stations, the method comprising:
calculating, by the ASN-GW, for a new MBS zone and existing MBS zones, coverage area ratios each based on information regarding the new MBS zone and one of the existing MBS zones, the new MBS zone including a first group of base stations to transmit data relating to the new MBS, the one of the existing MBS zones including a second group of base stations to transmit data relating to at least one existing MBS; and
allocating, by the ASN-GW, an MCID to the new MBS based on the coverage area ratios;
wherein the calculating comprises:
determining a number of the first group of base stations;
determining a number of the second group of base stations; and
determining a number of a third group of base stations, the third group including ones of the plurality of base stations in both the first group and the second group; and
calculating the coverage area ratio for the new MBS zone and the one of the existing MBS zones, the coverage area ratio being equal to a ratio between the number of the third group of base stations and a larger one of the number of the first group of base stations and the number of the second group of base stations.

19. An Access Service Network Gateway (ASN-GW) for use in a communication system providing a plurality of multicast/broadcast services (MBSs) in a wireless network and for transmitting data relating to the plurality of MBSs, the ASN-GW comprising:
a processor configured to calculate, for a new MBS zone and existing MBS zones, coverage area ratios each based on information regarding the new MBS zone and one of the existing MBS zones, the new MBS zone including a first group of base stations to transmit data relating to a new MBS, the one of the existing MBS zones including a second group of base stations to transmit data relating to at least one of the plurality of MBSs; and
a memory device configured to store the coverage area ratios;
wherein the processor is further configured to:
determine a magnitude of a first area covered by signals transmitted by the first group of base stations;
determine a magnitude of a second area covered by signals transmitted by the second group of base stations;
determine a magnitude of a third area covered by both the signals transmitted by the first group of base stations and the signals transmitted by the second group of base stations; and
calculate the coverage area ratio for the new MBS zone and the one of the existing MBS zones, the coverage area ratio being equal to a ratio between the magnitude of the third area and a larger one of the magnitude of the first area and the magnitude of the second area; and
wherein the processor is further configured to allocate a multicast connection identifier (MCID) to the new MBS based on the coverage area ratios.

20. The ASN-GW of claim 19, wherein the ASN-GW is further configured to transmit the data relating to new MBS to a user terminal through at least one of the first group of base stations.

21. The ASN-GW of claim 20, wherein the user terminal is a mobile station.

22. An Access Service Network Gateway (ASN-GW) for use in a communication system providing a plurality of multicast/broadcast services (MBSs) in a wireless network and for transmitting data relating to the plurality of MBSs, the ASN-GW comprising:
a processor configured to calculate, for a new MBS zone and existing MBS zones, coverage area ratios each based on information regarding the new MBS zone and one of the existing MBS zones, the new MBS zone including a first group of base stations to transmit data relating to a new MBS, the one of the existing MBS zones including a second group of base stations to transmit data relating to at least one of the plurality of MBSs; and
a memory device configured to store the coverage area ratios;
wherein the processor is further configured to:
determine a number of the first group of base stations;
determine a number of the second group of base stations;
determine a number of a third group of base stations, the third group including ones of the plurality of base stations in both the first group and the second group; and calculate the coverage area ratio for the new MBS zone and the one of the existing MBS zones, the coverage area ratio being equal to a ratio between the number of the third group of base stations and a larger one of the number of the first group of base stations and the number of the second group of base stations; and wherein the processor is further configured to allocate a multicast connection identifier (MCID) to the new MBS based on the coverage area ratios.

* * * * *